United States Patent [19]

Sakaegi et al.

[11] Patent Number: 4,951,276

[45] Date of Patent: Aug. 21, 1990

[54] RECORDING APPARATUS WITH SWITCH ACTUATED MEMORY STORAGE OF RECORDING MEDIUM REMOVAL OR LOADING AND BACKUP POWER SUPPLY FOR MEMORY

[75] Inventors: Yuji Sakaegi; Nobuo Fukushima; Ryosuke Miyamoto, all of Kanagawa, Japan

[73] Assignee: Canon Kabushiki Kaisha, Tokyo, Japan

[21] Appl. No.: 127,638

[22] Filed: Dec. 2, 1987

[30] Foreign Application Priority Data

Dec. 3, 1986 [JP] Japan .................. 61-288070

[51] Int. Cl.$^5$ ............................................ G11B 15/00
[52] U.S. Cl. ........................................ 369/58; 369/57; 369/30; 369/33; 360/55; 360/6; 360/131; 360/72.1; 365/229
[58] Field of Search ................ 358/335, 342, 906, 909; 360/55, 137, 97, 131–135, 35.1, 72.1, 72.2, 6, 69; 365/228, 229, 52; 369/53, 54, 58, 33, 30, 57

[56] References Cited

U.S. PATENT DOCUMENTS

| | | | |
|---|---|---|---|
| 4,593,376 | 6/1986 | Volk .................. | 365/52 X |
| 4,652,939 | 3/1987 | Baumeister .............. | 360/69 |
| 4,675,755 | 6/1987 | Baumeister et al. .......... | 360/35.1 |
| 4,706,233 | 11/1987 | d'Alayer .................. | 369/30 X |

*Primary Examiner*—Robert L. Richardson
*Attorney, Agent, or Firm*—Robin, Blecker, Daley & Driscoll

[57] ABSTRACT

A recording apparatus capable of exchanging the recording medium includes a switch arranged to operate when the recording medium is exchanged, an electronic memory for storing the output of the switch in the electrical form, and a backup battery for supplying electrical power to the memory. Despite that the main electrical power source is cut off, the memory retains the storage of the fact of whether or not an event of exchanging the recording medium has ever occurred. After the position of the recording head has been readjusted, the memory is erased easily and quickly.

16 Claims, 3 Drawing Sheets

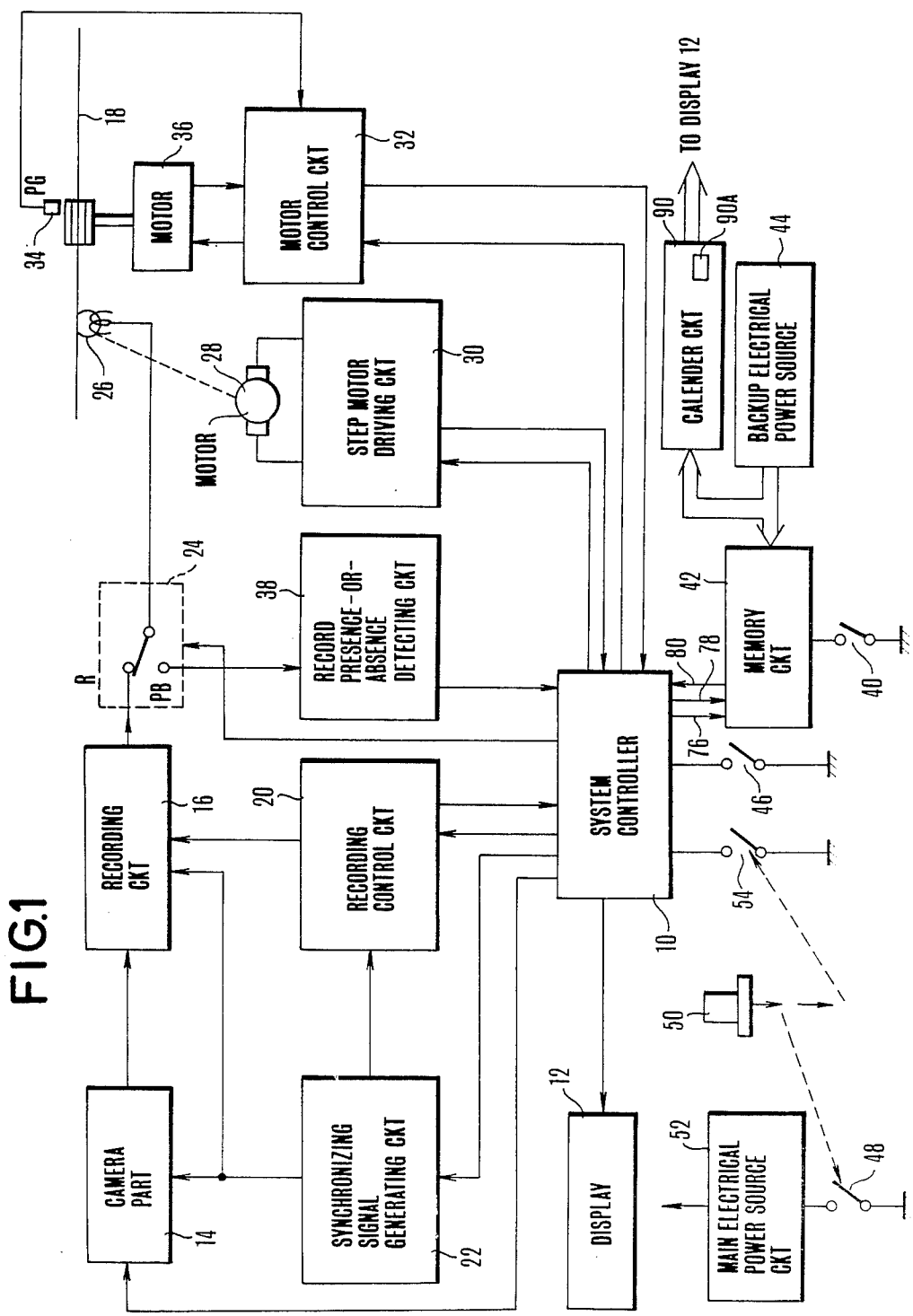

RECORDING APPARATUS WITH SWITCH ACTUATED MEMORY STORAGE OF RECORDING MEDIUM REMOVAL OR LOADING AND BACKUP POWER SUPPLY FOR MEMORY

BACKGROUND OF THE INVENTION

1. Field of the Invention

This invention relates to a recording apparatus capable of exchanging the recording medium and, more particularly, to a device for memorizing the occurrence of an exchange of the recording medium.

2. Description of the Related Art

Recently, increasing numbers of portable instruments (for example, electronic still) have employed a recording apparatus using the rotary type of recording medium such as a magnetic disc or drum to record information (for example, a video signal) in successive concentric or annular tracks. Such an apparatus for convenient recording necessitates that provision for preventing double recording. In other words, prior to making a record, the recording head must be positioned in registry with a fresh track just next to the last recorded one.

A method for preventing double recording to be used in this kind of positioning mechanism is based on a process comprising the steps of detecting whether or not there is a recording on the given track to which the recording head is applied; as the recording medium is loaded; if so, then the recording head is moved to the next track and such a procedure is repeated until a first fresh track is reached, as, for example, disclosed in Japanese Laid-Open Patent Application No. Sho 54-140515 (corresponding to U.S. Pat. application Ser. No. 030,930 filed Apr. 17, 1979).

If such a method is used in combination with, for example, a control sequence that either when in completing the recording of one track, or when the next cycle of recording operation, the recording head is moved to the next track, the recording apparatus employing the same has an ability to memorize where the first fresh track or the last recorded track lies respectively, since the relative position to the recording medium which the recording head is presently taking serves as an index therefor. In other words, even when the electrical power supply has once been cut off, or, in the case of the battery driving, when the battery as the electrical power source has been removed for replacement by a new one, or for recharging, or when the actual voltage of the battery has fallen below the threshold level, if the electrical power source is later thrown again, or recovers, the index is useful to that recording medium which was used in the preceding cycle of recording operation, provided the recording head is left unchanged in position therebetween. Hence, a new recording operation may be carried out from the position the recording head now has. This will not result in double recording or creation of a useless recording area (blank track).

With this feature alone, however, in the case when the recording medium has been exchanged at the time of cutoff of the electrical power supply in one way or another, the present position of the recording head loses its meaning. If the recording proceeds without re-adjustment of the position of the recording head, double recording or formation of a blank track will occur.

To cope with such a situation, the performance of the above-described process for positioning the recording head in registry with the track intended to be recorded has to be recycled each time the electrical power source is switched on. But, this is unreasonable insofar as there is no event of exchange of the recording medium. In application to the camera wherein the electrical power source is switched on in response to actuation of a camera release, the real-time recording capability (in the terminology of the ordinary camera, the so-called "snap" shooting) will be damaged in photographic situations. Further in the case of the battery driven instruments, premature consumption of electrical energy will result.

Even in application to types of apparatus other than that described above, for example, operating with selection of recording heads depending on the characteristic or sort of the recording medium used, or with means for setting various conditions for recording, a similar problem to that described above will arise.

To eliminate such a problem, the present patent applicant has made a previous proposal for providing a mechanism for memorizing the occurrence of an event of exchange of the recording medium and brought forth a method for re-adjusting the position of the recording medium in accordance with the operative position of the memory mechanism in Japanese Patent Application No. Sho 60-22633 corresponding to U.S. Pat. application Ser. No. 826.117 filed Feb. 5, 1986.

The memory mechanism proposed in the above-cited document has, however, because of its employing the mechanical memory, a drawback of increasing the number of parts of the apparatus. This is disadvantageous as respects manufacturability and cost. Moreover, an additional mechanism for erasing the mechanical memory becomes necessary and it takes a long time to complete the erasing operation. Thus, there is substantial room for improvement.

SUMMARY OF THE INVENTION

A first object of the present invention is to provide a recording apparatus which has improved the above-described points.

A second object is to provide a recording apparatus which can be manufactured to a low price.

Another object is to provide a recording apparatus capable of rapidly changing the content of memory means as the working condition for the medium changes.

Still another object is to provide a recording apparatus with means, though of simple structure, making it possible to memorize with high reliability that the recording medium has been exchanged.

Under such objects, according to a preferred embodiment of the invention as applied to the recording medium-exchangeable type of recording apparatus, a recording apparatus includes switch means responsive to loading of a recording medium or removal thereof for producing an output signal, electronic memory means for storing the signal in the electronic form, and a backup electrical power source for supplying electrical power to the electronic memory means. Since the occurrence of an event of exchange of the recording medium is stored by the electronic type of memory means, and also since the supply of electrical power to the electronic memory means is sustained by the backup electrical power source, it is possible to continue storing the fact of whether or not the recording medium has been exchanged, even after the main electrical power source is depleted. Further, because the memory means is of the electronic type, it is quick and easy to erase the memory means.

Other objects and features of the invention will become apparent from the following description of an embodiment thereof taken in conjunction with the accompanying drawings.

BRIEF DESCRIPTION OF THE DRAWINGS

FIG. 1 is a block diagram of the construction and arrangement of the elements of an electronic still camera to which the present invention is applied.

DETAILED DESCRIPTION OF THE PREFERRED EMBODIMENT

Figure 2A:
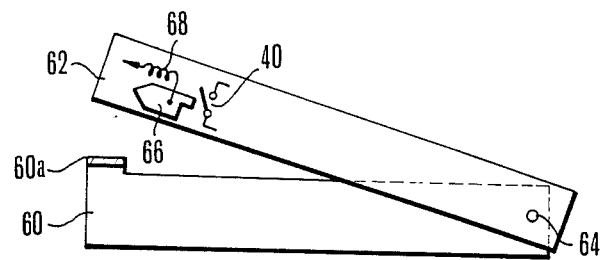
FIGS. 2A, 2B and 2C are side elevational views taken to explain the relationship between the opening and closing of the cover of a disc drive and the operative positions of a detector or switch therefor.

The present invention is next described in connection with an embodiment thereof applied to the electronic still camera.

In FIG. 1, a system controller 10 controls all portions of the electronic still camera. The state of the system indicated to the user by a display 12. A camera part 14 is comprised of an optical system for focusing an object image on an image pickup element, a shutter and others. A recording circuit 16 converts the photo-signals from the image pickup element of the camera part 14 to video signals which are then processed (with FM-modulation and other treatments) to obtain signals to be recorded on a magnetic disc 18. The operation of the recording circuit 16 is controlled by a recording control circuit 20 in accordance with indication from the system controller 10. A synchronizing signal generating circuit 22 drives the image pickup element of the camera part 14, and produces synchronizing signals which coordinate the recording circuit 16 with the recording control circuit 20. A mode selection switch 24 is in its R position when in the record mode, and moves to its PB position when in the reproduction mode.

A recording/reproducing head 26 is movable in a radial direction of the magnetic disc 18 and is connected to a step motor 28. Responsive to indication from the system controller 10, a drive circuit 30 drives the step motor 28. A motor control circuit 32 receives a signal representing the speed of rotation of the magnetic disc 18 from a detector 34 to control a drive motor 36 for the magnetic disc 18. The reproduced signal from the head 26 is received by a record presence-or-absence detecting circuit 38 to determine whether that area of the magnetic disc 18 which is being reproduced was already recorded or not recorded yet.

A switch 40 for detecting occurrence of an opening-and-closing operation of a cover of the disc drive is shown in the form of a normally open switch arranged to be closed for a moment during either of the times when the cover is opened and when closed. The switch 40 may otherwise be constructed and arranged so that it turns off when the cover of the disc drive is open, and on when the cover is closed. A memory circuit 42 always monitors which state, opening or closing, the switch 40 is set in for the purpose of memorizing the opening and closing of the cover of the disc drive. A backup electrical power source 44 allows the memory circuit 42 to retain its stored value even when the main electrical power source is cut off. A switch 46 detects whether or not the magnetic disc 18 is inserted into and seated on the disc drive. A switch 48 is closed when a release button 50 is half pushed down. By closing the switch 48, the various portions of the camera are supplied with electrical power from a main electrical power source circuit 52. When the release button 50 is further pushed down, a switch 54 is closed to indicate an initiation of a recording operation to the system controller 10.

Figure 2B:
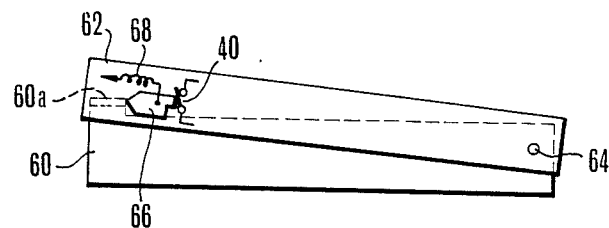
Figure 2C:
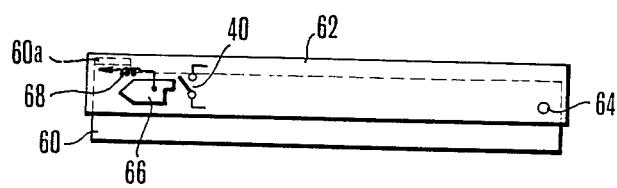

FIGS. 2A, 2B and 2C show successive operative position of the switch 40 as the cover of the disc drive is moved from the open position of FIG. 2A past an intermediate position of FIG. 2B to the closed position of FIG. 2C. A holder 62 for the magnetic disc 18 is hinged to a disc drive body 60 at a shaft 64, and also serves as the cover for the body 60. The switch 40 is positioned in the interior of the disc holder 62. An actuator in the form of a slide member 66 is arranged adjacent the movable contact of the switch 40. A spring 68 urges the slide member 66 to move away from the movable contact of the switch 40. To co-operate with the slide member 66, the body 60 is provided with a projected portion 60a positioned so that the slide member 66 is driven to move toward the movable contact of the switch 40 against a spring 68 in the first half of the course of movement of the cover (disc holder 62) from the open position (FIG. 2A) to the closed position (FIG. 2C).

By the action of this set of members 60a and 66, the switch 40 is closed for a moment during each of the times when the cover (disc holder 62) opens and when it closes.

Figure 3:
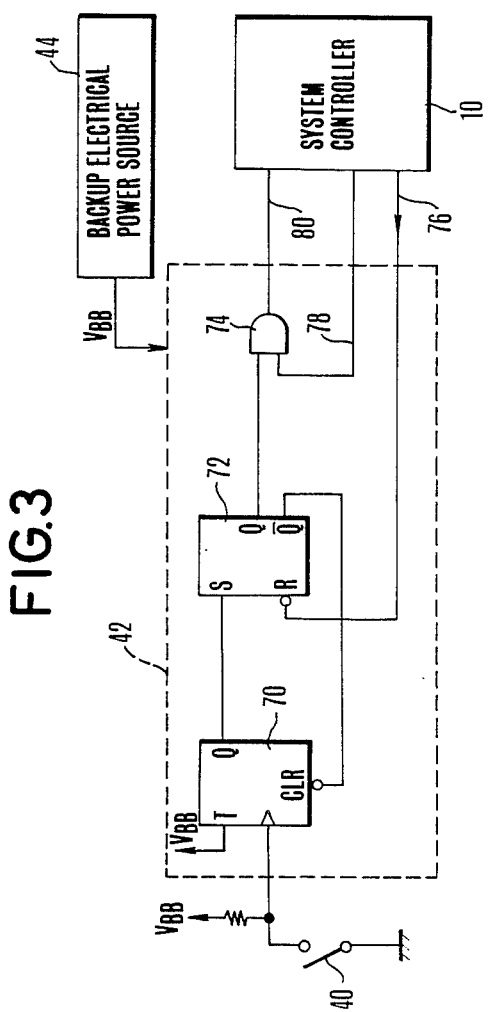
FIG. 3 is a diagram illustrating a practical example of the memory circuit 42 of FIG. 1.

FIG. 3 shows an example of the construction and arrangement of the elements of the memory circuit 42. One pole of the switch 40 is connected to circuit earth, and the other is connected to a battery as the backup electrical power source $V_{BB}$. The positive pole of the switch 40 is connected to a clock input of a T-FF 70, of which the T-input is connected to the positive terminal of the battery $V_{BB}$. An output $\overline{Q}Q$ of the T-FF 70 is connected to the "set" input (S) of an RS-FF 72, of which an output Q is connected to one of two inputs of an AND gate 74. The inversed output Q of the RS-FF 72 is connected to a "clear" input of the T-FF 70. The signal applied to the "reset" input (R) of the RS-FF 72 from the system controller 10 through a signal line 76 usually takes low level. A read signal for the memory circuit 42 is applied from the system controller 10 through a signal line 78 to the other input of the AND gate 74. Responsive to this signal, the AND gate 74 produces an output representing the memorized value which is fed back to the system controller 10 through a signal line 80.

As the cover opens or closes, when the switch 40 is instantaneously closed, the output Q of the T-FF 70 becomes high level. By this, the RS-FF 72 is set, producing a signal of high level at its output Q. Since, at the same time, the inverted Q output of the RS-FF 72 becomes low level, the T-FF 70 is cleared. Thus, its output Q is changed again to low level. Because the supply of electrical power to this memory circuit 42 is not from the main electrical power source circuit 52 but from the backup electrical power source 44, regardless of the condition of the main electrical power source circuit 52, the occurrence of an event of opening or closing the cover of the disc drive can be memorized in the form of setting the RS-FF 72. Hence, the system controller 10 can be informed of whether or not the cover has ever been opened or closed at any time when it puts the inquire signal of high level on the signal line 78.

Upon receipt of the information that the cover of the disc drive has once been opened and closed, the system controller 10 operates the motor control circuit 32, step motor drive circuit 30 and switch 24 to find a fresh region of the recording area of the disc 18 with the help of the record presence-or-absence detecting circuit 38. For this case, at the same time, the system controller 10 renders the signal line 76 active so that the RS-FF 72 is reset. This allows for the subsequent occurrence of the opening and closing of the cover to be detected.

Also, in this embodiment, the backup electrical power source 44 supplies electrical power to another circuit, for example, a watch calendar circuit 90. The working condition of this circuit 90 is displayed on the display 12 (time or calendar display). Therefore, suppose the capacity, for example, the voltage, of the backup electrical power source 44 drops, then a voltage detecting circuit 90A included in the calendar circuit 90 is actuated to present an alarm display. By this, the user can understand that the electronic memorization has become inaccurate.

It should be recognized that it is easy to incorporate the memory circuit 42 into the watch calendar circuit 90. If done so, the present invention can be realized without involving an increase in the number of separate constituent parts of the camera.

Though the present invention has been described by taking an example of the electronic still camera, it is to be understood that the present invention is applicable to other types of recording apparatus, for example, that dealing with audio signals or data signals. Further, besides the magnetic recording method, another method, for example, the optical recording one may be combined with the invention. As to the recording medium, the invention is not confined to the disc-shaped one but may be used with a drum or tape shaped medium.

As is readily understandable from the foregoing, according to the invention, memorization of the occurrence of an event of exchanging the recording medium is electrically made with advantages that though the form is very simple compared with the mechanical one of the memory means, the reliability is very high, and it can be manufactured at a low price. It is also made possible to erase the memory means easily and quickly.

We claim:

1. A recording apparatus for recording on a recording medium which can be changed, comprising:
   (a) switch means for outputting a signal in response to loading or removal of the recording medium;
   (b) electronic memory means for electrically memorizing the signal outputted by said switch means; and
   (c) a backup electrical power source for supplying electrical power to said electronic memory means.

2. A recording apparatus according to claim 1, wherein said switch means is changed in position only for a short time in response to loading or removal of said recording medium.

3. A recording apparatus according to claim 1, wherein said switch means includes:
   a mechanical switch structure which changes its switching state in response to loading or removal of said recording medium.

4. A recording apparatus according to claim 3, wherein said switch structure changes its switching state only for a short time in response to loading or removal of said recording medium.

5. A recording apparatus according to claim 1, wherein said electronic memory means includes a flip-flop.

6. A recording apparatus according to claim 1, further comprising:
   (d) detecting means for detecting an unrecorded area of said recording medium depending on the memorized signal in said electronic memory means.

7. A recording apparatus according to claim 6, wherein said detecting means includes:
   (a) reproducing means for reproducing each recording block on said recording medium;
   (b) a detecting circuit for detecting whether or not said recording block was recorded on the basis of the reproduction output of said reproducing means; and
   (c) control means responsive to the memorized signal in said electronic memory means for actuating the operations of said reproducing means and said detecting circuit.

8. A recording apparatus according to claim 1, further comprising:
   (d) another circuit to which electrical power is supplied from said backup electrical power source.

9. A recording apparatus according to claim 8, wherein said another circuit is a watch circuit.

10. A recording apparatus according to claim 8, wherein said another circuit is a circuit for detecting the capacity of said backup electrical power source.

11. A recording apparatus according to claim 10, wherein said detecting circuit detects the capacity by detecting the voltage of said backup electrical power source.

12. A recording apparatus for recording on a recording medium which can be changed, comprising:
   (a) switch means for outputting a signal in response to loading or removable of said recording medium;
   (b) electronic memory means for electrically memorizing the signal outputted by said switch means;
   (c) a backup electrical power source for supplying electrical power to said switch means and said electronic memory means; and
   (d) another circuit supplied with electrical power by said backup electrical power source.

13. An apparatus according to claim 12, wherein said another circuit is a circuit for detecting the capacitance of said backup electrical power source.

14. An apparatus according to claim 13, wherein said detecting circuit detects the capacitance by detecting the voltage of said backup electrical power source.

15. An apparatus according to claim 12, further comprising:
   (e) recording or reproducing means for recording or reproducing information on or from said recording medium; and
   (f) means, provided in separation from said backup electrical power source, for supplying electrical power source to said recording or reproducing means.

16. An apparatus according to claim 12, wherein said switch means changes its switching state in response to loading or removal of said recording medium.

* * * * *